UNITED STATES PATENT OFFICE.

AUGUSTE BÉHAL, OF PARIS, FRANCE, ASSIGNOR, BY MESNE ASSIGNMENTS, TO SPECIAL PRODUCTS COMPANY, A CORPORATION OF NEW JERSEY.

MANUFACTURE OF CELLULOID.

No. 831,028.　　　Specification of Letters Patent.　　　Patented Sept. 18, 1906.

Application filed May 29, 1905. Serial No. 262,927.

*To all whom it may concern:*

Be it known that I, AUGUSTE BÉHAL, chemist, a citizen of the Republic of France, and a resident at 4 Avenue de l'Observatoire, Paris, have invented certain new and useful Improvements in the Manufacture of Celluloid; and I do hereby declare the following to be a full, clear, and exact description of the invention, such as will enable others skilled in the art to which it appertains to make and use the same.

This invention relates to the manufacture of celluloid; and it consists in an improvement on the ordinary manufacture whereby borneol is substituted for the whole or a part of the camphor usually employed.

I have discovered that the borneols, particularly the mixture consisting almost entirely of iso-borneol, obtained by a direct or indirect hydration of camphenes, possess a property of forming a homogeneous mixture with nitrocellulose in presence of solvents for that substance—such as, for example, ethyl acetate, amyl acetate, acetone, a mixture of alcohol and ether, or the like—and that the product from which the solvent has been removed constitutes an excellent celluloid.

The following example illustrates the invention: To treat one kilo of dry nitrocellulose, the material is first moistened with a sufficient quantity of alcohol of ninety-six degrees strength, the alcohol being left in contact with the nitrocellulose until the latter has become saturated therewith. About five hundred grams of iso-borneol or another borneol are dissolved in about five hundred to six hundred grams of ethyl acetate or some other suitable solvent of nitrocellulose, and the solution is mixed with the moistened nitrocellulose, the mixture being afterward subjected to the action of rollers or deprived of its solvent by evaporation in air or by any other suitable procedure. There is thus produced a very good celluloid.

The proportions of the solvent may be varied within sufficiently wide limits. On the other hand, although it is preferable to moisten the nitrocellulose with alcohol, this is not indispensable.

If desirable, camphor may be used, together with borneol, by substituting camphor for a portion of the borneol, the weight of camphor used being equal to that of the borneol which it supplants.

Having thus described the nature of my said invention and the best means I know of carrying the same into practical effect, I claim—

1. A process for the manufacture of celluloid, consisting in dissolving borneol in a solvent for nitrocellulose, mixing intimately the dissolved borneol with the nitrocellulose, and eliminating the solvent after the mixture has become homogeneous.

2. A process for the manufacture of celluloid, consisting in dissolving borneol in a solvent for nitrocellulose, moistening the nitrocellulose with alcohol, mixing intimately this moistened nitrocellulose with the solution of borneol, and eliminating the solvent after the mixture has become homogeneous.

3. A process for the manufacture of celluloid, consisting in dissolving borneol in a solvent for nitrocellulose, mixing intimately the solution of borneol and some camphor with nitrocellulose, and eliminating the solvent after the mixture has become homogeneous.

4. A process for the manufacture of celluloid, consisting in dissolving borneol in a solvent for nitrocellulose, moistening the nitrocellulose with alcohol, mixing intimately the moistened nitrocellulose with the solution of borneol and some camphor, and eliminating the solvent after the mixture has become homogeneous.

5. A process for the manufacture of celluloid, consisting in dissolving iso-borneol in a solvent for nitrocellulose, moistening the nitrocellulose with alcohol and mixing the same with the solution of iso-borneol and finally removing the solvent.

In testimony that I claim the foregoing as my invention I have signed my name in presence of two subscribing witnesses.

AUGUSTE BÉHAL.

Witnesses:
　CHARLES ASSI,
　ALCIDE FABE.